US012098041B2

(12) United States Patent
Sugimoto

(10) Patent No.: US 12,098,041 B2
(45) Date of Patent: Sep. 24, 2024

(54) IMAGE FORMING APPARATUS

(71) Applicant: TOSHIBA TEC KABUSHIKI KAISHA, Tokyo (JP)

(72) Inventor: Shinya Sugimoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/301,278

(22) Filed: Apr. 17, 2023

(65) Prior Publication Data

US 2023/0249929 A1 Aug. 10, 2023

Related U.S. Application Data

(63) Continuation of application No. 17/221,952, filed on Apr. 5, 2021, now Pat. No. 11,655,111.

(51) Int. Cl.

| | |
|---|---|
| ***B65H 1/14*** | (2006.01) |
| ***B65H 1/18*** | (2006.01) |
| ***B65H 3/06*** | (2006.01) |
| ***B65H 5/06*** | (2006.01) |
| ***B65H 7/14*** | (2006.01) |
| ***G03G 15/00*** | (2006.01) |

(52) U.S. Cl.

CPC ................. *B65H 1/14* (2013.01); *B65H 1/18* (2013.01); *B65H 3/0669* (2013.01); *B65H 3/0684* (2013.01); *B65H 5/068* (2013.01); *B65H 7/14* (2013.01); *G03G 15/6511* (2013.01)

(58) Field of Classification Search

CPC .......... B65H 1/14; B65H 1/18; B65H 3/0684; B65H 3/66; B65H 3/68; B65H 7/00; B65H 7/02; B65H 7/14; B65H 2511/22

See application file for complete search history.

(56) References Cited

U.S. PATENT DOCUMENTS

2012/0256367 A1* 10/2012 Matsushima ............ B65H 1/14 271/147
2015/0259163 A1* 9/2015 Kawamura .......... B65H 3/0684 271/264

FOREIGN PATENT DOCUMENTS

JP 01104523 4/1989
JP 0873055 3/1996

(Continued)

OTHER PUBLICATIONS

Non-Final Office Action for U.S. Appl. No. 17/221,952 dated Sep. 13, 2022.

*Primary Examiner* — Prasad V Gokhale

(74) *Attorney, Agent, or Firm* — Amin, Turocy & Watson, LLP

(57) ABSTRACT

An image forming apparatus includes a paper feeding cassette, a first conveying unit, a lift mechanism, a motor, a second conveying unit, and a control unit. The controller drives the motor and, if a value indicating a movement amount of the tray moving from when the lift mechanism starts the lifting of the tray until when a position of the top part reaches a first position is a first value, matches a position of the first conveying unit, which comes into contact with the top part to thereby rise together with the tray, with a second position and, if the value indicating the movement amount is a second value larger than the first value, matches the position of the first conveying unit, which comes into contact with the top part to thereby rise together with the tray, with a third position lower than the second position.

19 Claims, 12 Drawing Sheets

(56) References Cited

FOREIGN PATENT DOCUMENTS

| | | |
|---|---|---|
| JP | 08169568 | 7/1996 |
| JP | 10329959 | 12/1998 |
| JP | 2011-046459 | 3/2011 |

* cited by examiner

IMAGE FORMING APPARATUS

CROSS-REFERENCE TO RELATED APPLICATIONS

This application is a Continuation of application Ser. No. 17/221,952 filed on Apr. 5, 2021, the entire contents of which are incorporated herein by reference.

FIELD

Embodiments described herein relate generally to an image forming apparatus and methods related thereto.

BACKGROUND

There has been known an image forming apparatus capable of picking up, with a pickup roller, one by one, one or more printing media stacked on a paper feeding cassette and conveying the picked-up printing medium. Such an image forming apparatus includes, in the paper feeding cassette, a tray on which the printing media are stacked and a lift mechanism that lifts the tray toward the pickup roller together with the printing media. The image forming apparatus includes two rollers, that is, a paper feeding roller and a separation roller that, if a plurality of printing media are picked up by the pickup roller, separate the plurality of printing media one by one. The image forming apparatus includes, between the two rollers and the pickup roller, a guide unit that guides the printing medium picked up by the pickup roller toward a nip of the two rollers. The guide unit is present before the two rollers to enable the two rollers to sufficiently carry out a function of separating the plurality of printing media one by one. If the number of printing media stacked on the try changes, an angle of the tray lifted by the lift mechanism with respect to the horizontal plane changes and a position where the printing medium enters the guide unit changes. The change of the entering position causes fluctuations in performance for making it easy for the guide unit to separate the plurality of printing media.

DETAILED DESCRIPTION

Figure 1:
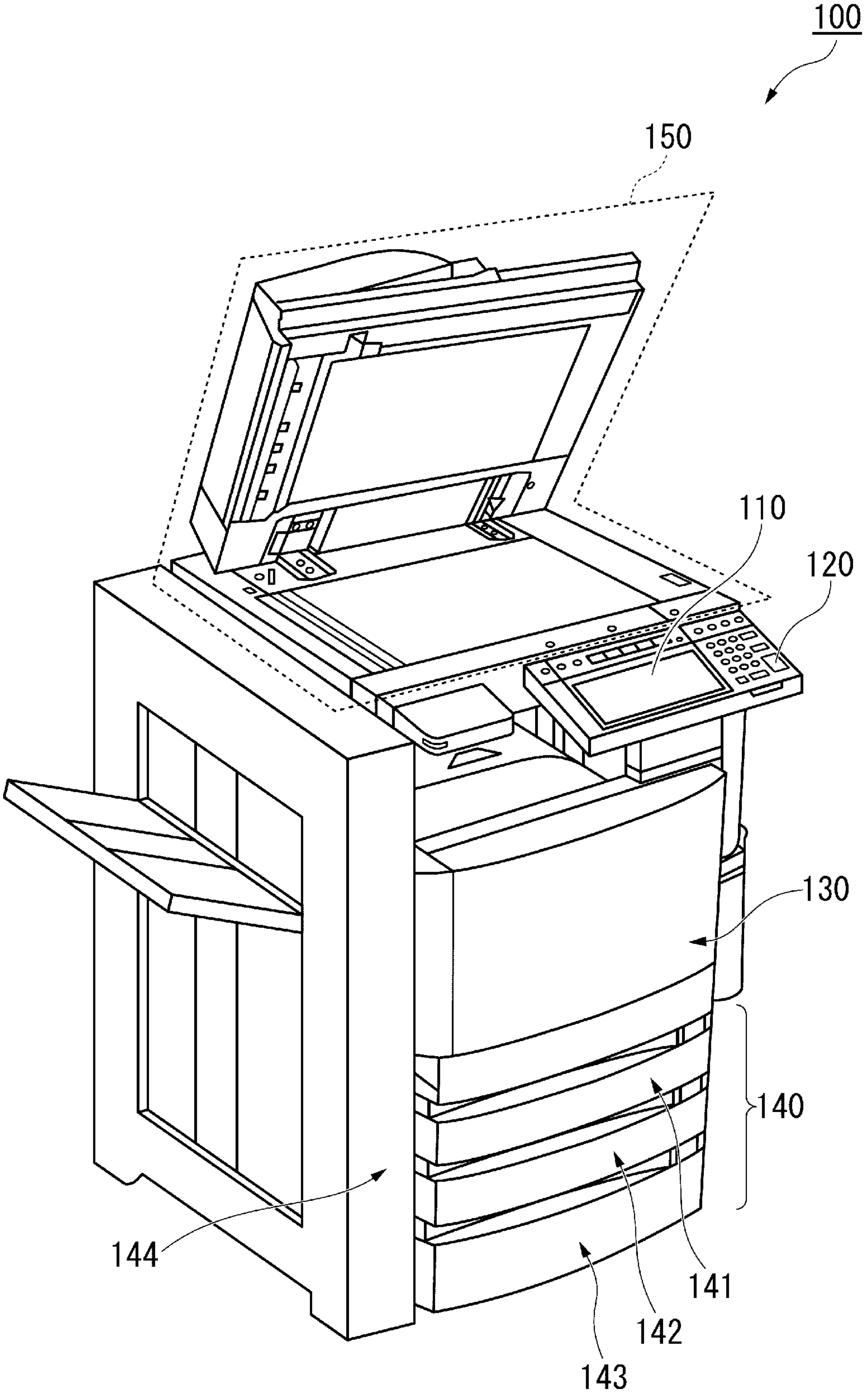
FIG. 1 is a diagram showing an example of the configuration of an image forming apparatus.

An image forming apparatus includes a paper feeding cassette, a first conveying unit, a lift mechanism, a motor, a second conveying unit, and a control unit. The paper feeding cassette includes a tray on which one or more sheets are stacked. The first conveying unit comes into contact with a sheet stacked at a top part among the one or more sheets stacked on the tray and conveys the sheet from the top part. The lift mechanism lifts the tray and brings the one or more sheets stacked on the tray close to the first conveying unit. The motor causes the lift mechanism to lift the tray. The second conveying unit conveys the sheet conveyed by the conveying unit to a conveyance path. The control unit drives the motor and, if a value indicating a movement amount of the tray moving from when the lift mechanism starts the lifting of the tray until when a position of the top part reaches a first position is a first value, matches a position of the first conveying unit, which comes into contact with the top part to thereby rise together with the tray, with a second position and, if the value indicating the movement amount is a second value larger than the first value, matches the position of the first conveying unit, which comes into contact with the top part to thereby rise together with the tray, with a third position lower than the second position. In another embodiment, a paper handling method, involves contacting a sheet stacked at a top part among the one or more sheets stacked on a tray and conveying the sheet from the top part; lifting the tray and bringing the one or more sheets stacked on the tray close to a first conveying component; conveying the sheet conveyed by the first conveying component to a conveyance path using a second conveying component; and controlling the lifting and, if a value indicating a movement amount of the tray moving from when the lifting of the tray starts until when a position of the top part reaches a first position is a first value, matching a position of the first conveying component, which comes into contact with the top part to thereby rise together with the tray, with a second position and, if the value indicating the movement amount is a second value larger than the first value, matching the position of the first conveying component, which contacts the top part to thereby rise together with the tray, with a third position lower than the second position.

An image forming apparatus according to an embodiment is explained with reference to the drawings. In figures, the same components are denoted by the same reference numerals and signs. In the following explanation, an image forming apparatus 100 is explained as an example of the image forming apparatus according to the embodiment. In the following explanation of the embodiment, the gravity direction is referred to as downward direction or downward and the direction opposite to the gravity direction is referred to as upward direction or upward. In the embodiment, a plane orthogonal to the gravity direction is referred to as horizontal plane.

Configuration of the Image Forming Apparatus

The configuration of the image forming apparatus 100 is explained with reference to FIG. 1. FIG. 1 is a diagram showing an example of the configuration of the image forming apparatus 100.

The image forming apparatus 100 is an apparatus that forms an image on a printing medium. For example, the image forming apparatus 100 is a multifunction peripheral, a copying machine, a printer, or the like. The printing medium means a medium on which the image forming apparatus 100 forms an image. The printing medium may be any medium if the medium is a sheet-like medium, on at least one of both sides of which an image can be formed. The printing medium may be referred to as sheet as well. For example, the printing medium is printing paper, a plastic film, or the like.

The image forming apparatus 100 includes a display 110, a control panel 120, a printer unit 130, a printing-media storing unit 140, and an image reading unit 150.

The display 110 is an image display device such as a liquid crystal display or an organic EL (Electro Luminescence) display. The display 110 displays various kinds of information concerning the image forming apparatus 100.

The control panel 120 includes a plurality of buttons. The control panel 120 receives operation by a user. The control panel 120 outputs a signal corresponding to operation performed by the user to a control unit of the image forming apparatus 100. The display 110 and the control panel 120 may be configured as an integral touch panel.

The printer unit 130 forms an image on a printing medium based on image information received via a communication path. The printer unit 130 forms an image on the printing medium based on image information generated by the image reading unit 150. The printer unit 130 may be a device that fixes a toner image or may be an inkjet-type device.

The printer unit 130 forms an image on a printing medium according to, for example, processing explained below. An image forming unit of the printer unit 130 forms an electrostatic latent image on a photoconductive drum based on image information. The image forming unit of the printer unit 130 adheres a developer on the electrostatic latent image to thereby form a visible image. Toner is a specific example of the developer. A transfer unit of the printer unit 130 transfers the visible image onto a printing medium. A fixing unit of the printer unit 130 heats and pressurizes the printing medium to thereby fix the visible image on the printing medium. The printing medium on which an image is formed may be a printing medium stored in the printing-media storing unit 140 or may be a manually fed printing medium.

The printing-media storing unit 140 stores printing media used for image formation in the printer unit 130. The printing-media storing unit 140 includes one or more paper feeding cassettes and a printing-media storing unit main body into which each of the one or more paper feeding cassettes is inserted. In the following explanation, as an example, the printing-media storing unit 140 includes three paper feeding cassettes, that is, a paper feeding cassette 141, a paper feeding cassette 142, and a paper feeding cassette 143 and a printing-media storing unit main body 144.

The configurations of the three paper feeding cassettes included in the printing-media storing unit 140 may be the same or may be different from one another. In the following explanation, as an example, the configurations of the three paper feeding cassettes are the same.

Figure 2:
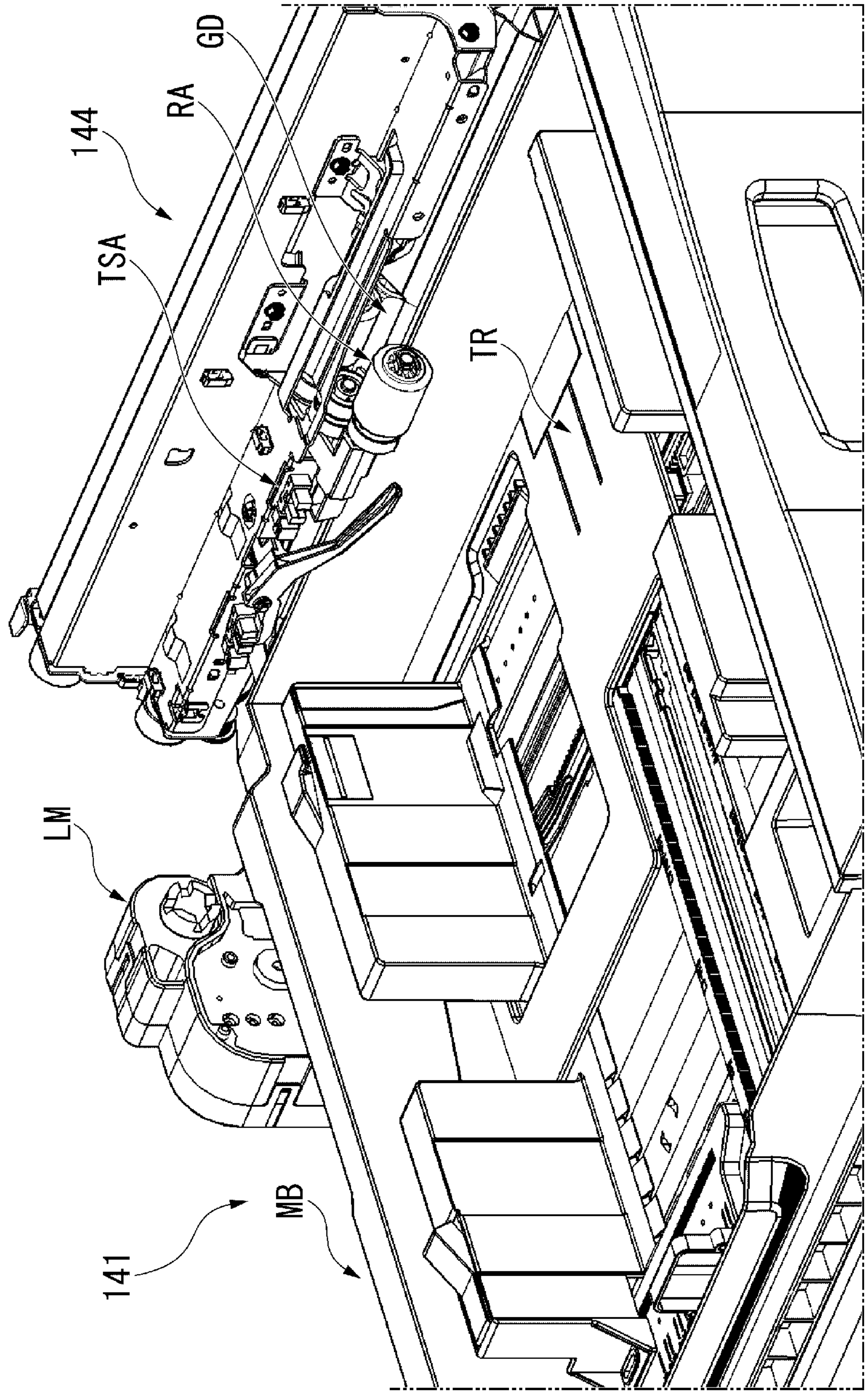
FIG. 2 is a diagram showing an example of the configuration of a paper feeding cassette, which is one of three paper feeding cassettes included in a printing-media storing unit.

FIG. 2 is a diagram showing an example of the configuration of the paper feeding cassette 141, which is one of the three paper feeding cassettes included in the printing-media storing unit 140. Explanation about the configuration of the paper feeding cassette 142 and the configuration of the paper feeding cassette 143 is omitted because, in this example, the configurations are the same as the configuration of the paper feeding cassette 141.

The paper feeding cassette 141 includes a housing MB and a tray TR.

The housing MB is a container having a substantially rectangular parallelepiped shape and is a container, the upper surface of which is opened without being closed. The tray TR is provided on the inner side of the housing MB.

The tray TR is a substantially flat member on which one or more printing media are stacked. A part of a lift mechanism LM is connected to the tray TR. An end portion on a first direction side among end portions of the tray TR is rotated centering on a certain fulcrum by the lift mechanism LM. Consequently, the tray TR performs an up-down motion. The fulcrum is provided at, for example, an end portion on the second direction side among the end portions of the tray TR but is not limited to this. The first direction means a direction from an upstream side toward a downstream side in a conveying direction in which a printing medium is conveyed. The second direction means a direction from the downstream side toward the upstream side in the conveying direction. In the following explanation, as an example, the up-down motion is an up-down motion for setting the end portion on the first direction side among the end portions of the tray TR higher than the end portion on the second direction side among the end portions of the tray TR.

Each of the three paper feeding cassettes included in the printing-media storing unit 140 is inserted into the printing-media storing unit main body 144. The printing-media storing unit main body 144 conveys, according to control by the control unit of the image forming apparatus 100, a printing medium from the paper feeding cassette selected by the control unit among the inserted three paper feeding cassettes to the printer unit 130.

The printing-media storing unit main body 144 includes the lift mechanism LM, a first conveying unit RA, a first detecting unit TSA, a guide unit GD, and a second conveying unit RB.

Figure 3:
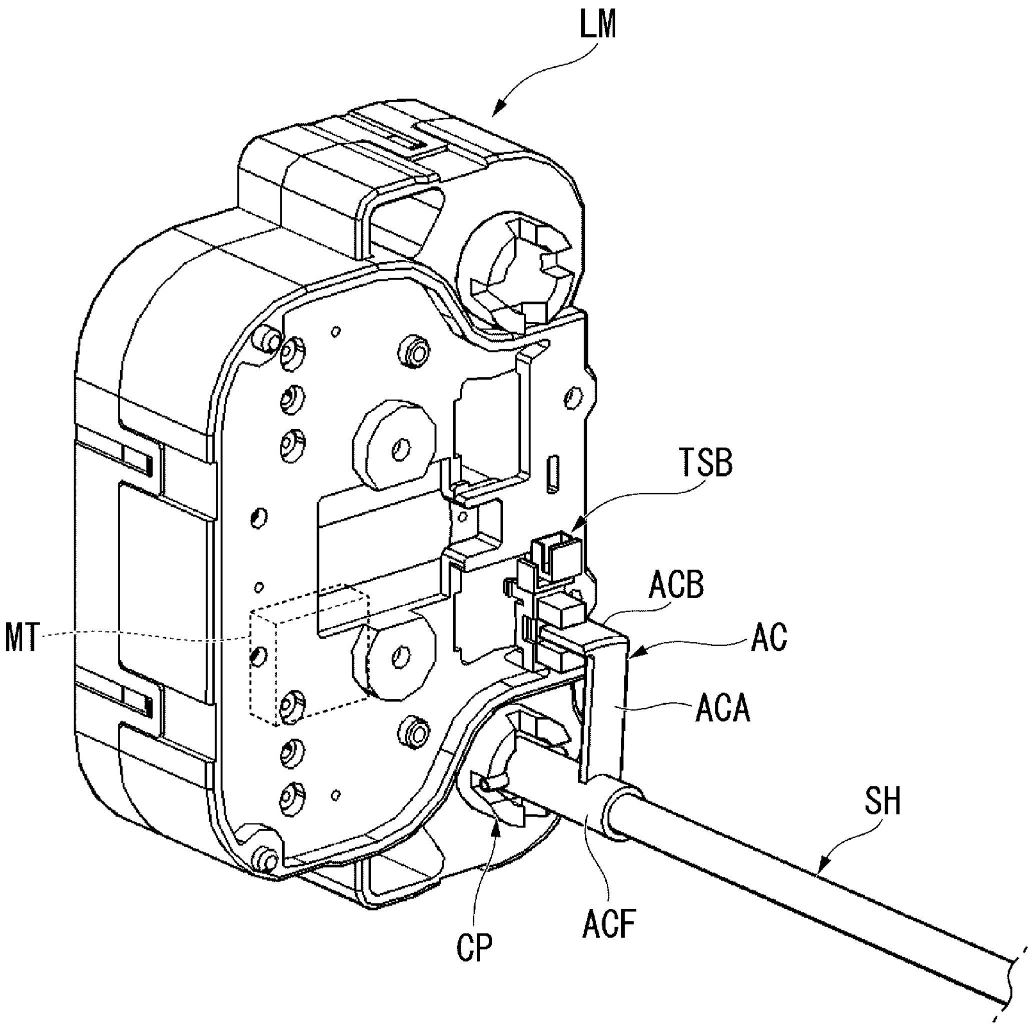
FIG. 3 is a diagram showing an example of the configuration of a lift mechanism.

The lift mechanism LM moves the tray TR up and down. For example, if the paper feeding cassette 141 is inserted into the printing-media storing unit main body 144, the lift mechanism LM lifts the tray TR and brings one or more printing media stacked on the tray TR close to the first conveying unit RA provided in a position located on the upper side of the tray TR. The lift mechanism LM includes, as shown in FIG. 3, a motor MT, a coupling CP, a shaft SH, a first member AC, and a second detecting unit TSB. The coupling CP fits with the shaft SH included in the cassette 141. The lift mechanism LM rotates the coupling CP according to rotation of the motor MT. Consequently, the shaft SH rotates together with the coupling CP and the tray TR moves up and down. Therefore, the lift mechanism LM further includes various mechanisms (for example, a gear, a cam, and a link) that move the tray TR up and down according to the rotation of the shaft SH. FIG. 3 is a diagram showing an example of the configuration of the lift mechanism LM.

The motor MT is, for example, a servomotor. The motor MT may be, instead of the servomotor, a motor of another type controllable by the control unit of the image forming apparatus 100.

The coupling CP transmits a driving force of the motor MT to the shaft SH. The coupling CP rotates according to rotation of a rotating shaft of the motor MT to thereby rotate the shaft SH.

The shaft SH is a shaft body that rotates via the coupling CP according to driving of the motor MT. A first member AC that rotates together with the shaft SH is provided in the shaft SH.

The first member AC is sometimes called an actuator. The first member AC includes a fixed portion ACF fixed to the shaft SH to rotate together with the shaft SH. The first member AC includes a first portion ACA extending from the fixed portion ACF in a direction orthogonal to a direction in which the shaft SH extends. In other words, the first member AC includes a first portion ACA extending from the fixed portion ACF in a direction orthogonal to the axial direction of the shaft SH. The first member AC further includes a second portion ACB extending from an end portion on the opposite side of the fixed portion ACF among the end portions of the first portion ACA. The second portion ACB extends, for example, in a direction from the first portion ACA toward the motor MT of two directions parallel to the axial direction of the shaft SH.

The fixed portion ACF of the first member AC may be configured integrally with the shaft SH. The first portion ACA of the first member AC may be configured to extend from the fixed portion ACF in a direction oblique to the axial direction of the shaft SH. The second portion ACB of the first member AC may be configured to extend from a portion other than the end portions among portions of the first portion ACA. The second portion ACB may be configured to extend in a direction nonparallel to the axial direction of the shaft SH.

The position of the first member AC is represented by, for example, a position of the end portion on the opposite side of the first portion ACA among end portions of the second portion ACB. In this case, the first member AC is attached to the shaft SH such that the position of the first member AC coincides with a predetermined position PA at timing when the lift mechanism LM starts the lifting of the tray TR. The position PA is one of positions on a route that the end portion rotating together with the shaft SH according to the rotation of the shaft SH passes. The position of the first member AC may be represented by, instead of the position of the end portion, another value corresponding to the first member AC such as a rotation angle of the first member AC around the axis of the shaft SH or may be represented by another position corresponding to the first member AC.

The second detecting unit TSB is a sensor that detects, according to the position of the first member AC rotating together with the shaft SH, that the lift mechanism LM start the lifting of the tray TR. As explained above, the first member AC is attached to the shaft SH such that the position of the first member AC coincides with the predetermined position PA at the timing when the lift mechanism LM starts the lifting of the tray TR. Accordingly, by detecting that the end portion on the opposite side of the first portion ACA among the end portions of the second portion ACB passed the position PA, the second detecting unit TSB can detect that the lift mechanism LM started the lifting of the tray TR. In this case, for example, the second detecting unit TSB includes two projecting sections that hold the end portion of the second portion ACB located in the position PA. The two projecting sections do not interfere with the second portion ACB and do not hinder movement of the second portion ACB. A first projecting section, which is one of the two projecting sections, includes a radiating unit ES that radiates light toward a second projecting section, which is the other of the two projecting sections. The second projecting section includes a light receiving unit DS that receives the light radiated from the radiating unit ES. If the end portion on the opposite side of the first portion ACA among the end portions of the second portion ACB passes the position PA, the light reception by the light receiving unit DS of the light radiated from the radiating unit ES is blocked by the second portion ACB. That is, the light reception by the light receiving unit DS of the light radiated from the radiating unit ES is blocked by the second portion ACB, whereby the second detecting unit TSB detects that the end portion on the opposite side of the first portion ACA among the end portions of the second portion ACB passed the position PA. In other words, the light reception by the light receiving unit DS of the light radiated from the radiating unit ES is blocked by the second portion ACB, whereby the second detecting unit TSB detects that the lift mechanism LM started the lifting of the tray TR.

Figure 4:
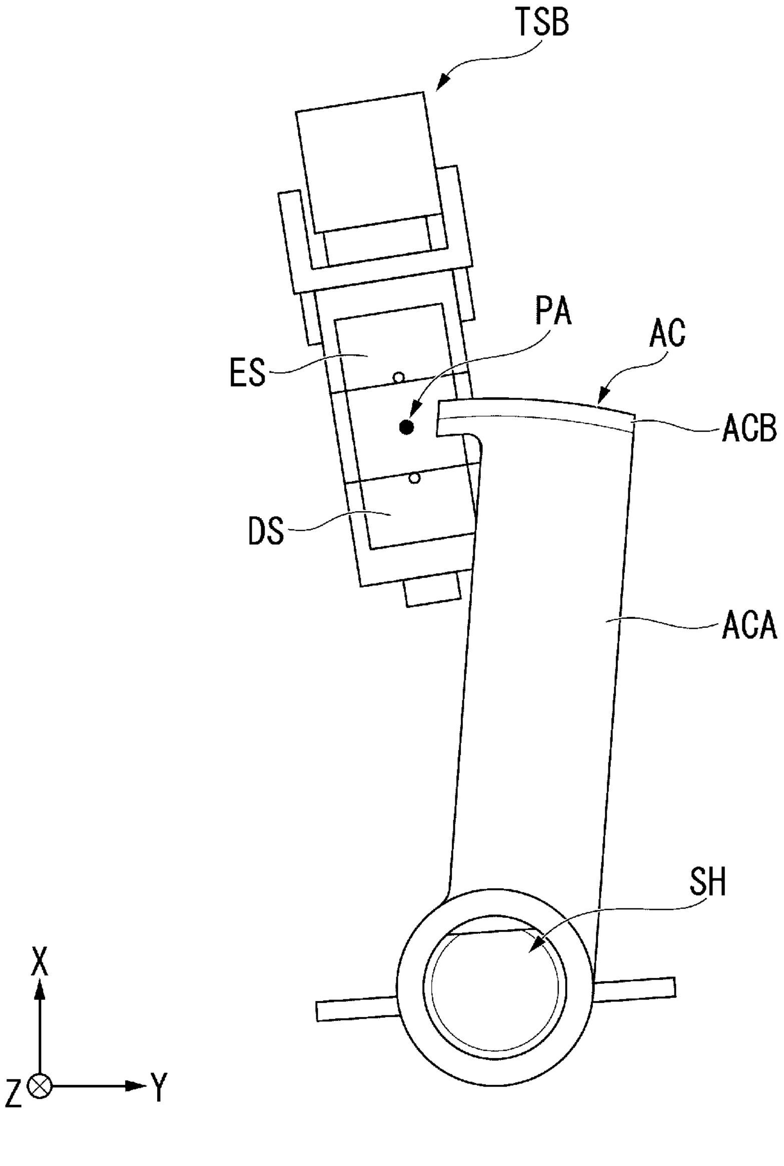
FIG. 4 is a diagram showing an example of a positional relation between a first member and a second detecting unit in a state before a second portion passes a position.
Figure 5:
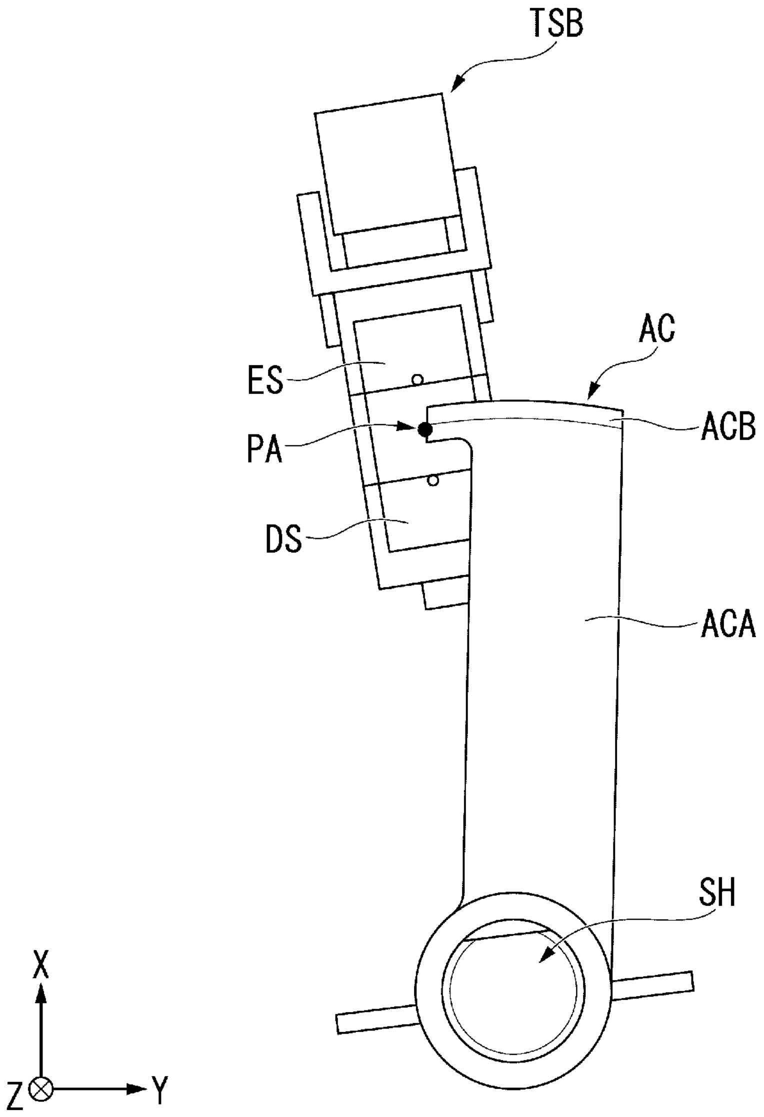
FIG. 5 is a diagram showing an example of a positional relation between the first member and the second detecting unit in a state in which the second portion starts to pass the position.
Figure 6:
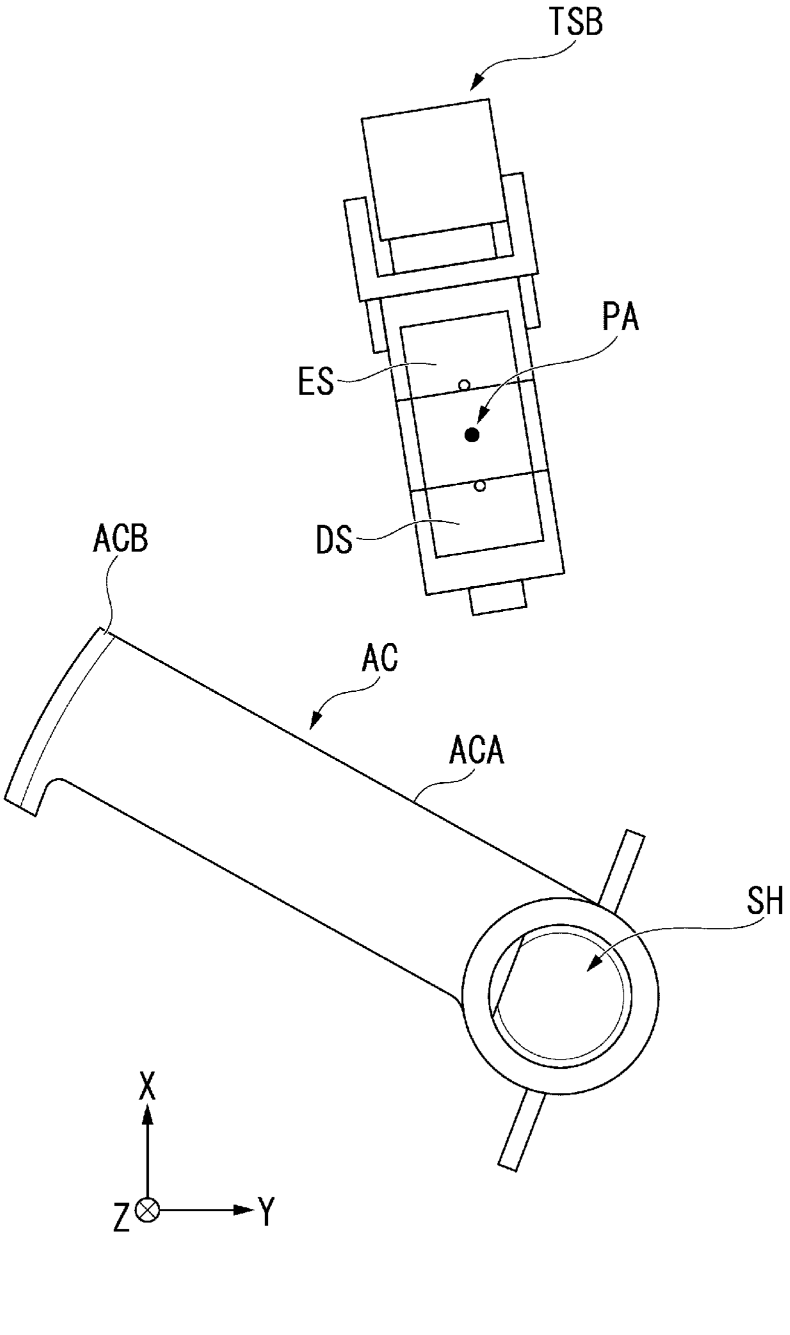
FIG. 6 is a diagram showing an example of a positional relation between the first member and the second detecting unit in a state after the second portion passes the position.

FIG. 4 is a diagram showing an example of a positional relation between the first member AC and the second detecting unit TSB in a state before the second portion ACB passes the position PA. FIG. 5 is a diagram showing an example of a positional relation between the first member AC and the second detecting unit TSB in a state in which the second portion ACB started to pass the position PA. FIG. 6 is a diagram showing an example of a positional relation between the first member AC and the second detecting unit TSB in a state after the second portion ACB passed the position PA. Three-dimensional orthogonal coordinate systems shown in FIGS. 4 to 6 indicate directions in respective FIGS. 4 to 6. In FIGS. 4 to 6, a direction in which the second portion ACB of the first member AC extends from the first portion ACA and a positive direction of a Z axis coincide.

In the state shown in FIG. 4, the light reception by the light receiving unit DS of the light radiated from the radiating unit ES is not blocked by the second portion ACB. Accordingly, in this state, the second detecting unit TSB does not detect a start of the lifting of the tray TR by the lift mechanism LM. On the other hand, in the state shown in FIG. 5, the light reception by the light receiving unit DS of the light radiated from the radiating unit ES is blocked by the second portion ACB. Accordingly, in this state, the second detecting unit TSB detects the start of the lifting of the tray TR by the lift mechanism LM and outputs, to the control unit of the image forming apparatus 100, information indicating that the lift mechanism LM started the lifting of the tray TR. As shown in FIG. 6, even after passing the position PA, according to the rotation of the shaft SH, the second portion ACB continues to move until the rotation of the shaft SH stops. If the tray TR falls, the shaft SH rotates in a direction opposite to a direction in which the shaft SH rotates if the tray TR rises. However, since the second detecting unit TSB does not interfere with the second portion ACB, the second portion ACB can pass the position PA again and returns to the position before the tray TR starts to rise.

The lift mechanism LM may be configured integrally with the paper feeding cassette 141. In this case, the lift mechanism LM is included in the paper feeding cassette 141. The lift mechanism LM may be configured separately from the motor MT. The second detecting unit TSB may be configured integrally with the paper feeding cassette 141.

The first conveying unit RA comes into contact with a printing medium stacked at a top part among one or more printing media stacked on the tray TR and conveys the printing medium from the top part. For convenience of explanation, the top part is simply referred to as a top part. The first conveying unit RA is, for example, a pickup roller. As explained above, the first conveying unit RA is provided in a position located on the upper side of the tray TR. The first conveying unit RA is provided to be capable of moving in the up-down direction (or substantially the up-down direction). The first conveying unit RA comes into contact with a printing medium stacked at the top part according to the rising of the tray TR and is pushed up by the top part and rises. If the top part is not in contact with the first conveying unit RA, the first conveying unit RA is located in the lowest position among positions to which the first conveying unit RA is capable of moving.

The first detecting unit TSA detects that the position of the top part reached a predetermined first position according to the operation of the lift mechanism LM. The position of the top part is represented by, for example, the position of a contact point of the top part and the first conveying unit RA at the time when the top part and the first conveying unit RA come into contact. In this case, for example, by detecting the first conveying unit RA pushed up by the top part, the first detecting unit TSA can detect that the position of the top part reached the first position. The first detecting unit TSA may be any sensor if the sensor is a sensor capable of detecting that the position of the top part reached the first position. If detecting that the position of the top part reached the first position, the first detecting unit TSA outputs, to the control unit of the image forming apparatus 100, information indicating that the position of the top part reached the first position.

The guide unit GD guides the printing medium conveyed by the first conveying unit RA to the second conveying unit RB included in the printing-media storing unit main body 144. Accordingly, the guide unit GD is provided between the first conveying unit RA and the second conveying unit RB. Details of the second conveying unit RB are explained below. The guide unit GD has a slope, the height of which increases from an end portion on the second direction side among end portions of the guide unit GD toward an end portion on the first direction side among the end portions of the guide unit GD. The printing medium conveyed by the first conveying unit RA comes into contact with the slope and is guided toward the second conveying unit RB. The slope has a function of making it easy to separate a plurality of printing media one by one. That is, if the plurality of printing media are conveyed toward the second conveying unit RB by the first conveying unit RA, the slope makes it easy to separate the plurality of printing media one by one. However, the slope cannot always surely separate the plurality of printing media one by one. Accordingly, the image forming apparatus 100 separates, with the second conveying unit RB explained below, one by one, the plurality of printing media conveyed without being separated by the slope. Under such circumstances, the guide unit GD including the slope is sometimes also referred to as a pre-handling unit that handles the printing media before being separated by the second conveying unit RB to make it easy to separate the printing media. A method of imparting the function to the slope may be a known method or may be a method to be developed in future. In the following explanation, as an example, a coefficient of friction of the slope is adjusted, whereby the slope has the function. The guide unit GD may be included in the printing-media storing unit main body 144 instead of being included in the paper feeding cassette 141. For convenience of explanation, a position with which a printing medium conveyed by the first conveying unit RA comes into contact among positions on the guide unit GD is referred to as a contact position. The positions on the guide unit GD mean positions on the slope of the guide unit GD with which the printing medium can come into contact. The positions on the guide unit GD are represented by, for example, positions on an imaginary coordinate axis extending from the first conveying unit RA side toward the second conveying unit RB side along the slope.

Figure 7:
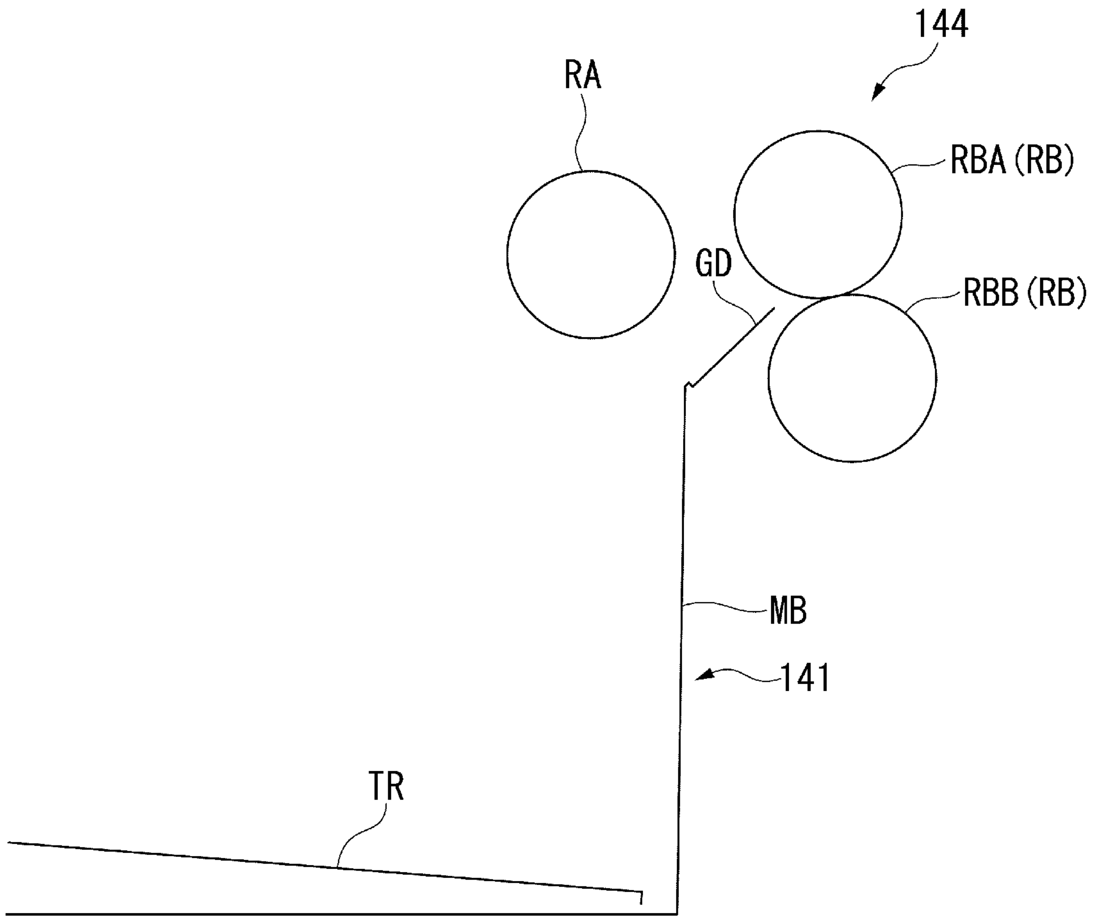
FIG. 7 is a diagram showing an example of the configuration of a printing-media storing unit main body in a state in which the paper feeding cassette is inserted.

The second conveying unit RB conveys the printing medium conveyed by the first conveying unit RA to a conveyance path further on the downstream side than the second conveying unit RB among conveyance paths to which the printing medium is conveyed. The conveyance path means a path on which the printing medium passes on the inside of the image forming apparatus 100 according to the conveyance of the printing medium by the image forming apparatus 100. As explained above, the second conveying unit RB separates, one by one, the plurality of printing media conveyed to the second conveying unit RB without being separated by the guide unit GD and conveys the plurality of printing media to the conveyance path further on the downstream side than the second conveying unit RB. For example, as shown in FIG. 7, the second conveying unit RB is configured by a paper feeding roller RBA and a separation roller RBB. FIG. 7 is a diagram showing an example of the configuration of the printing-media storing unit main body 144 in a state in which the paper feeding cassette 141 is inserted. In FIG. 7, to simplify the figure, only the paper feeding roller RBA and the separation roller RBB are drawn as components of the printing-media storing unit main body 144.

The paper feeding roller RBA comes into contact with the upper surface of a printing medium and conveys the printing medium in the first direction.

The separation roller RBB is provided to be opposed to the paper feeding roller RBA. The separation roller RBB holds the printing medium between the separation roller RBB and the paper feeding roller RBA. Therefore, a nip is formed between the paper feeding roller RBA and the separation roller RBB. The separation roller RBB includes a torque limiter coaxial with the separation roller RBB. If torque equal to or smaller than a predetermined threshold acts between the separation roller RBB and the torque limiter, the separation roller RBB rotates together with the torque limiter. On the other hand, if torque exceeding the threshold acts between the separation roller RBB and the torque limiter, the separation roller RBB slips on the torque limiter. The acting torque means torque for causing an end portion on the paper feeding roller RBA side in the separation roller RBB to rotate in the first direction with respect to the torque limiter. The threshold is set smaller than force applied to the separation roller RBB by the printing medium if only one printing medium enters the nip between the paper feeding roller RBA and the separation roller RBB. The threshold is set larger than the force applied to the separation roller RBB by the printing medium in contact with the separation roller RBB if a plurality of printing media enter the nip. Consequently, if only one printing medium enters the nip between the paper feeding roller RBA and the separation roller RBB, the separation roller RBB slips on the torque limiter. Accordingly, the separation roller RBB rotates in the first direction and the printing medium in contact with the separation roller RBB is conveyed to a conveyance path further on the downstream side than the second conveying unit RB. If a plurality of printing media enter the nip, the separation roller RBB does not rotate with respect to the torque limiter. Accordingly, the printing medium in contact with the separation roller RBB stays without being conveyed to the conveyance path. As a result, the second conveying unit RB can separate, one by one, the plurality of printing media conveyed to the second conveying unit RB without being separated by the guide unit GD. The torque limiter does not have to be coaxial with the separation roller RBB if such operation of the separation roller RBB can be realized.

The second conveying unit RB may not be configured by the paper feeding roller RBA and the separation roller RBB and may be configured by other members capable of conveying a printing medium conveyed by the first conveying unit RA to a conveyance path to which the printing medium is conveyed. However, even in this case, the second conveying unit RB desirably has a function of separating a plurality of printing media one by one.

The image reading unit 150 reads reading target image information based on brightness and darkness of light. The image reading unit 150 records the read image information. The recorded image information may be transmitted to other information processing apparatuses via a network. An image is formed on a printing medium by the printer 130 based on the recorded image information.

Functional Configuration of the Image Forming Apparatus

A functional configuration of the image forming apparatus 100 is explained below with reference to FIG. 8.

Figure 8:
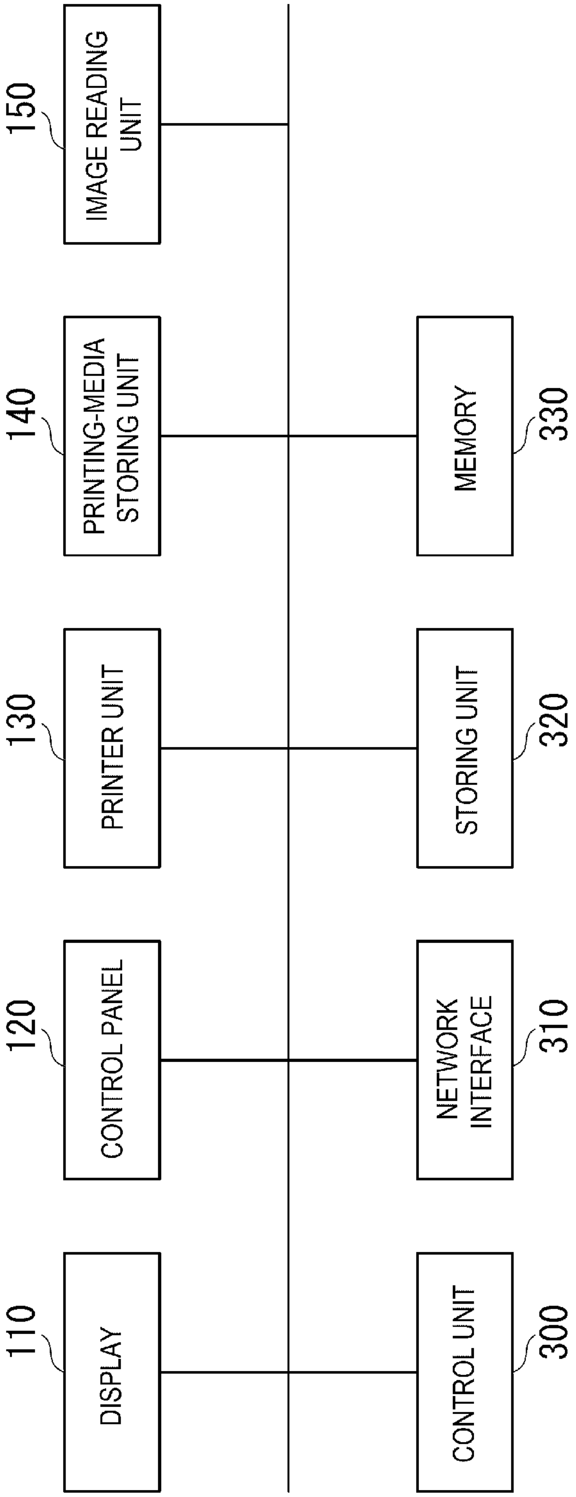
FIG. 8 is a diagram showing an example of a functional configuration of the image forming apparatus.

FIG. 8 is a diagram showing an example of the functional configuration of the image forming apparatus 100.

The image forming apparatus 100 includes the display 110, the control panel 120, the printer unit 130, the printing-media storing unit 140, and the image reading unit 150. The image forming apparatus 100 includes a control unit 300, a network interface 310, a storing unit 320, and a memory 330. These functional units included in the image forming apparatus 100 are communicably connected via a system bus.

Explanation about the display 110, the control panel 120, the printer unit 130, the printing-media storing unit 140, and the image reading unit 150 is omitted because the explanation is the same as the above explanation. The control unit 300, the network interface 310, the storing unit 320, and the memory 330 are explained.

The control unit 300 is an example of the control unit of the image forming apparatus 100. The control unit 300 includes the CPU (Centra Processing Unit) of the image forming apparatus 100. The control unit 300 controls the operations of the functional units of the image forming apparatus 100. The control unit 300 executes programs to thereby execute various kinds of processing. The control unit 300 acquires, from the control panel 120, an instruction input by the user. That is, the control unit 300 receives operation from the user with the control panel 120. The control unit 300 executes control processing based on the acquired instruction.

The control unit 300 performs, for example, the following processing if any one of the three paper feeding cassettes included in the printing-media storing unit 140 is inserted into the printing-media storing unit main body 144. As an example, the paper feeding cassette 141 is inserted into the printing-media storing unit main body 144. For example, this processing is processing including processing for driving the motor MT and starting the lifting of the tray TR by the lift mechanism LM. If the paper feeding cassette 141 is inserted into the printing-media storing unit main body 144, the control unit 300 drives the motor MT and starts the lifting of the tray TR by the lift mechanism LM. Thereafter, the control unit 300 specifies a value indicating a movement amount of the tray TR moving from when the lift mechanism LM started the lifting of the tray TR until when the position of the top part reaches the first position. For convenience of explanation, the value indicating the movement amount is simply referred to as a value indicating the movement amount. The control unit 300 continues the driving of the motor MT until a delay time corresponding to the specified value of the movement amount elapses. The control unit 300 stops the driving of the motor MT if the delay time elapses. Consequently, if the value indicating the movement amount is a first value, the control unit 300 can match, with a second position, the position of the first conveying unit RA that comes into contact with the top part to thereby rise together with the tray TR. If the value indicating the movement amount is a second value larger than the first value, the control unit 300 can match, with a third position lower than the second position, the position of the first conveying unit RA that comes into contact with the top part to thereby rise together with the tray TR. As a result, the control unit 300 can keep the contact position within an allowable range. The control unit 300 performs, for example, processing explained below. The position of the first conveying unit RA is represented by, for example, the position of the contact point where the first conveying unit RA and the printing medium at the top part come into contact. The position of the first conveying unit RA may be represented by another position corresponding to the first conveying unit RA.

The network interface 310 performs transmission and reception of data to and from another apparatus. The network interface 310 operates as an input interface and receives data transmitted from the other apparatus. The network interface 310 operates as an output interface and transmits data to the other apparatus.

The storing unit 320 is an auxiliary storage device such as a hard disk or an SSD (Solid State Drive). The storing unit 320 stores various kinds of information. For example, the storing unit 320 stores programs to be executed by the control unit 300. The programs are, for example, firmware and applications.

The memory 330 is, for example, a RAM (Random Access Memory). The memory 330 temporarily stores information used by the functional units included in the image forming apparatus 100. The memory 330 may store image information read by the image reading unit 150, programs for causing the functional units to operate, and the like.

Figure 9:
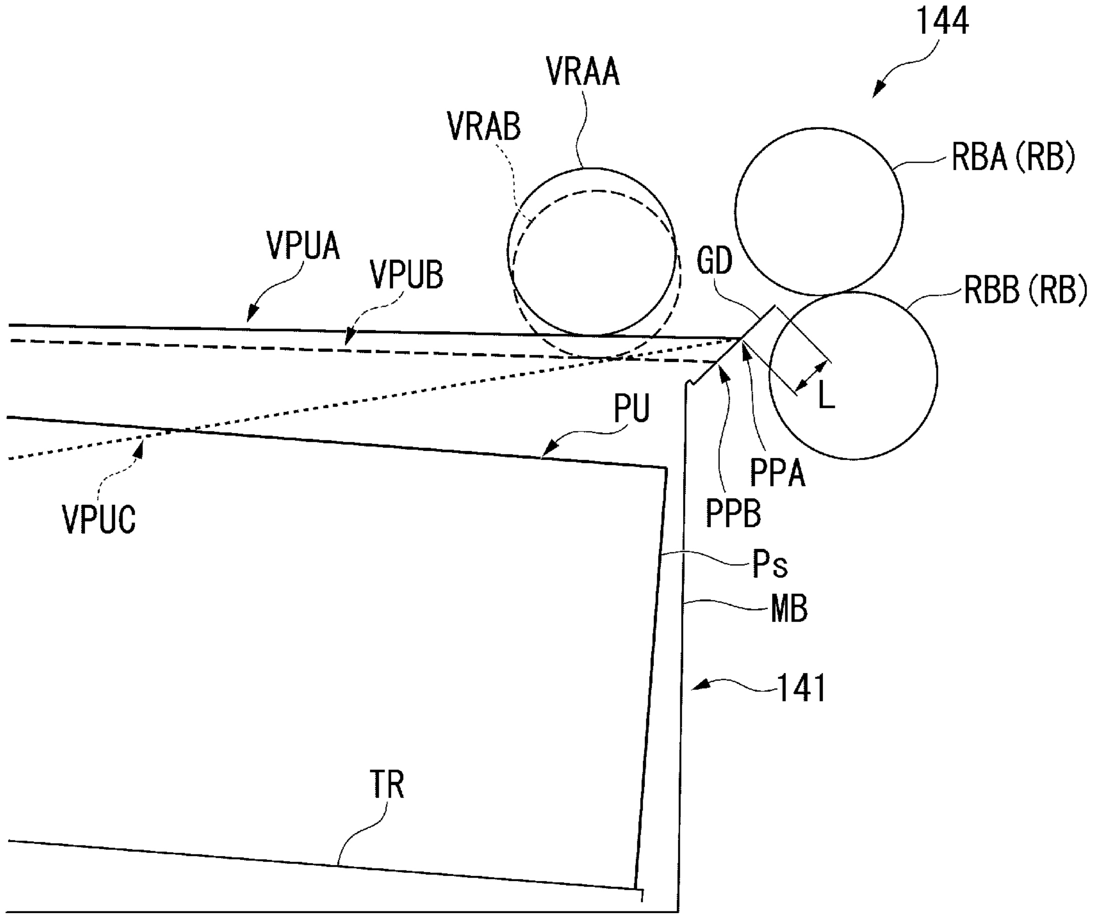
FIG. 9 is a diagram for explaining a relation between the number of printing media stacked on a tray and a contact position.

Relation Between the Number of Printing Media Stacked on the Tray and the Contact Position A relation between the number of printing media stacked on the tray TR and the contact position is explained with reference to FIG. 9. As an example, the relation in the case in which the paper feeding cassette 141 is inserted into the printing-media storing unit main body 144 is explained. FIG. 9 is a diagram for explaining the relation between the number of printing media stacked on the tray TR and the contact position. FIG. 9 is a diagram showing an example of the inside of the printing-media storing unit main body 144 when viewed from a direction parallel to a rotation axis of the first conveying unit RA. The paper feeding cassette 141 is inserted into the printing-media storing unit main body 144 shown in FIG. 9. That is, an example of a state of the inside of the printing-media storing unit main body 144, into which the paper feeding cassette 141 is inserted, is shown in FIG. 9. For convenience of explanation, timing when the position of the top part reaches the first position is referred to as reaching timing.

A dotted line VPUC shown in FIG. 9 is an imaginary line overlapping one printing medium at the reaching timing when the one printing medium is stacked on the tray TR. A dotted line VRAB shown in FIG. 9 indicates an example of the position of the first conveying unit RA at the reaching timing. If the driving of the motor MT stops at the reaching timing, the one printing medium is conveyed along the dotted line VPUC by the first conveying unit RA. As a result, the printing medium comes into contact with a position PPA among the positions on the guide unit GD. The position PPA is an example of the contact position.

On the other hand, a bundle Ps shown in FIG. 9 indicates an example of a bundle of a maximum storable number of printing media stacked on the tray TR. A dotted line VPUB shown in FIG. 9 indicates an imaginary line overlapping a printing medium located at the top part of the bundle Ps at the reaching timing. Even in a state in which the maximum storable number of printing media is stacked on the tray TR, the position of the first conveying unit RA at the reaching timing is the same as the position of the first conveying unit RA at the reaching timing when one printing medium is stacked on the tray TR. Accordingly, in the state in which the maximum storable number of printing media is stacked on the tray TR, if the driving of the motor MT stops at the reaching timing, the printing medium located at the top part of the bundle Ps is conveyed along the dotted line VPUB by the first conveying unit RA. As a result, the printing medium comes into contact with a position PPB among the positions on the guide unit GD. The position PPB is an example of the contact position. The position PPB is a position further on the second direction side than the position PPA. This means that, if the driving of the motor MT is stopped at the reaching timing, the contact position further shifts to the second direction side as the number of printing media stacked on the tray TR increases. On the other hand, if the driving of the motor MT is stopped at timing later than the reaching timing, the contact position further shifts to the first direction side as a time from the reaching timing to the timing is increased. The contact position is kept within the allowable range by adjusting, making use of the shift of the contact position, the time from the reaching timing until the timing for stopping the driving of the motor MT.

For example, a dotted line VPUA shown in FIG. 9 indicates an imaginary line overlapping the top part of the bundle Ps if timing later than the reaching timing is appropriately adjusted and the driving of the motor MT stops at the timing. A solid line VRAA shown in FIG. 9 indicates an example of the position of the first conveying unit RA at the timing. If the driving of the motor MT stops at the timing, the first conveying unit RA is pushed up by the top part and the position of the first conveying unit RA changes to the position indicated by the solid line VRAA, which is a position higher than the position indicated by the dotted line VRAB. The printing medium located at the top part of the bundle Ps is conveyed along the dotted line VPUA by the first conveying unit RA. As a result, the printing medium comes into contact with the position PPA. That is, the image forming apparatus 100 can keep the contact position within the allowable range by adjusting a time from the reaching timing until the timing when the driving of the motor MT is stopped. The delay time described above means such a time from the reaching timing to the timing. The control unit 300 adjusts the length of the delay time according to the magnitude of a value indicating a movement amount. For example, the control unit 300 specifies a value indicating a movement amount after driving the motor MT and adjusts the delay time based on the specified value of the movement amount and association information. The association information means information in which the value indicating the movement amount and the delay time are associated. In this case, the control unit 300 specifies, based on the association information, the delay time corresponding to the specified value indicating the movement amount. In this case, the association information is stored in advance in the storing unit 320. The control unit 300 may be configured to calculate, every time specifying the value indicating the movement amount, the delay time corresponding to the value indicating the movement amount or may be configured to specify the delay time with another method based on the value indicating the movement amount.

The timing when the driving of the motor MT is stopped is set to the timing later than the reaching timing according to the delay time in this way. Consequently, the control unit 300 can keep the contact position within the allowable range.

Processing Performed by the Control Unit

Figure 10:
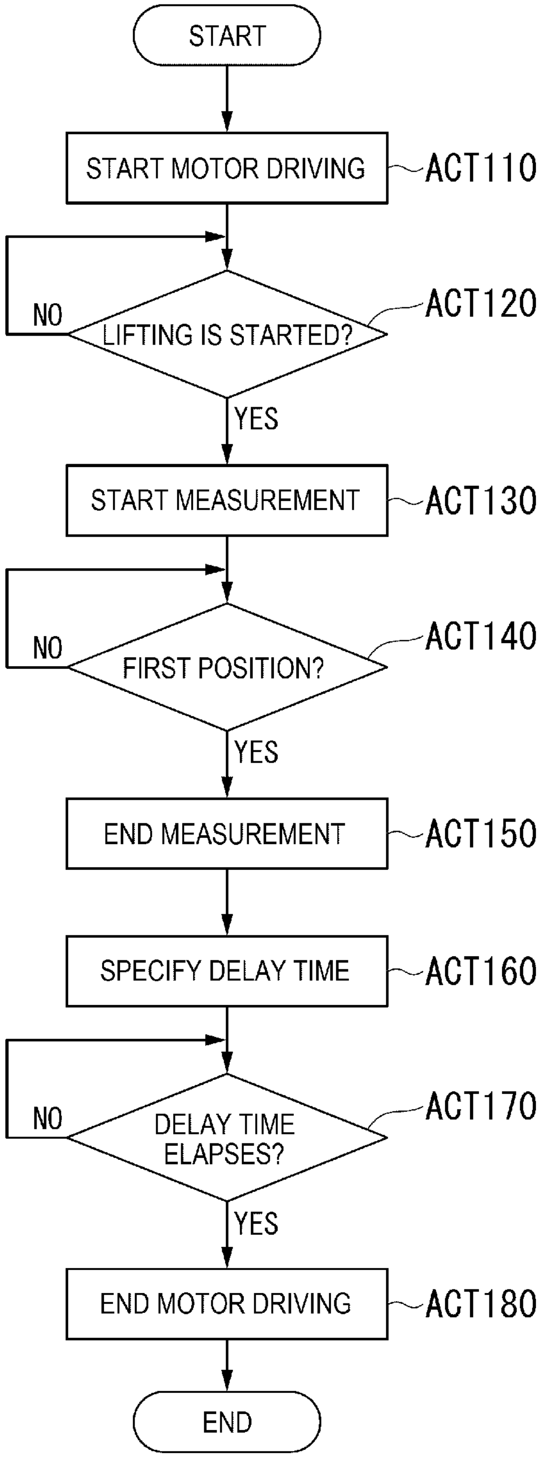
FIG. 10 is a diagram showing an example of a flow of processing performed by a control unit.

Processing performed by the control unit 300 is explained below with reference to FIG. 10. FIG. 10 is a diagram showing an example of a flow of the processing performed by the control unit 300. In the following explanation, as an example, the paper feeding cassette 141 is inserted into the printing-media storing unit main body 144 at timing before the processing in ACT 110 shown in FIG. 10 is performed.

After the paper feeding cassette 141 is inserted into the printing-media storing unit main body 144, the control unit 300 drives the motor MT and causes the lift mechanism LM to lift the tray TR (ACT 110).

Subsequently, the control unit 300 stays on standby until the lift mechanism LM starts the lifting of the tray TR (ACT 120). Specifically, if acquiring, in ACT 120, from the second detecting unit TSB, information indicating that the lift mechanism LM started the lifting of the tray TR, the control unit 300 determines that the lift mechanism LM started the lifting of the tray TR. On the other hand, if not acquiring, in ACT 120, from the second detecting unit TSB, information indicating that the lift mechanism LM started the lifting of the tray TR, the control unit 300 determines that the lift mechanism LM has not started the lifting of the tray TR. In FIG. 10, the processing in ACT 120 is shown as "LIFTING IS STARTED?".

The control unit 300 may be configured to specify, in ACT 120, as timing when the lift mechanism LM started the lifting of the tray TR, timing when the motor MT started driving in order to cause the lift mechanism LM to start the lifting of the tray TR. In this case, the image forming apparatus 100 may not include the second detecting unit TSB and the first member AC.

If determining that the lift mechanism LM started the lifting of the tray TR (YES in ACT 120), the control unit 300 starts measurement of a value indicating a movement amount (ACT 130).

Subsequently, the control unit 300 stays on standby until the position of the top part reaches the first position (ACT 140). Specifically, in ACT 140, if acquiring, from the first detecting unit TSA, information indicating that the position of the top part reached the first position, the control unit 300 determines that the position of the top part reached the first position. On the other hand, in ACT 140, if not acquiring, from the first detecting unit TSA, information indicating that the position of the top part reached the first position, the control 300 determines that the position of the top part has not reached the first position. In FIG. 10, the processing in ACT 140 is shown as "FIRST POSITION?".

Subsequently, the control unit 300 ends the measurement of the value indicating the movement amount (ACT 150).

The value indicating the movement amount may be, for example, a time from when the lift mechanism LM starts the lifting of the tray TR until when the position of the top part reaches the first position. In this case, specifically, the value indicating the movement amount is a time from timing when the processing in ACT 120 is performed until timing when the processing in ACT 150 is performed. In this case, the control unit 300 performs the measurement of the time while the processing in ACT 130 to ACT 150 is performed.

The value indicating the movement amount may be, for example, a value indicating a distance that the tray TR moves from when the lift mechanism LM starts the lifting of the tray TR until when the position of the top part reaches the first position. In this case, specifically, the value indicating the movement amount is a value indicating a distance that the tray TR moves from the timing when the processing in ACT 120 is performed until the timing when the processing in ACT 150 is performed. In this case, the image forming apparatus 100 includes a sensor, a device, or the like that detects the distance. In this case, the control unit 300 acquires the value indicating the distance from the sensor, the device, or the like while the processing in ACT 130 to ACT 150 is performed. Examples of the sensor, the device, or the like include an encoder that detects a rotation amount of the shaft SH rotated by the driving of the motor MT. If the sensor, the device, or the like is the encoder, the value indicating the distance is a pulse output from the encoder. Examples of the sensor, the device, or the like include an optical sensor that detects, based on reflected light of light radiated on a certain object, a distance to the object. If the sensor, the device, or the like is the optical sensor, the value indicating the distance is a distance to the position of the top part detected by the optical sensor.

Subsequently, the control unit 300 specifies a delay time corresponding to the value indicating the movement amount measured in the processing in ACT 130 to ACT 150 (ACT 160). For example, in ACT 160, the control unit 300 specifies, based on the value indicating the movement amount measured in the processing in ACT 130 to ACT 150 and the association information, a delay time corresponding to the value indicating the movement amount. The delay time associated with the value indicating the movement amount in the association information is a shorter time as the value indicating the movement amount is a larger value. This is because, as explained above, the contact position further shifts to the second direction side as the number of printing media stacked on the tray TR increases. For example, in the association information, 0 second is associated with, as the delay time, a value indicating a movement amount measured if one printing medium is stacked on the tray TR. For example, in the association information, a longest time among times of lengths that can be taken as the delay time is associated with a value indicating a movement amount measured if the maximum storable number of printing media specified in advance as the number of printing media storable in the paper feeding cassette 141 is stacked on the tray TR. 0 second being associated with, as the delay time, the value indicating the movement amount measured if one printing medium is stacked on the tray TR means that a contact position when one printing medium is stacked on the tray TR and when the delay time is 0 second is adopted as a contact position serving as a reference. A time longer than 0 second may be associated with, as the delay time, the value indicating the movement amount measured if one printing medium is stacked on the tray TR.

Length of the delay time specified according to the value indicating the movement amount is determined by a prior experiment, calculation by a theoretical formula, or the like such that the contact position is included in the allowable range. A median of the allowable range is, for example, among the positions of the guide unit GD, a contact point when one printing medium is stacked on the tray TR and the case in which the delay time is 0 second. In this case, a minimum value of the allowable range is, for example, a forward position further moved to a negative direction side of a coordinate axis than the contact position. The coordinate axis means an imaginary coordinate axis extending from the first conveying unit RA side toward the second conveying unit RB side along the slope of the guide unit GD. In this case, a maximum value of the allowable range is, for example, a forward position further moved to a positive direction side of the coordinate axis than the contact position. A distance of the movement is, for example, approximately 3 millimeters but may be a distance shorter than 3 millimeters or may be a distance longer than 3 millimeters.

Because of such a reason, the control unit 300 can keep the contact position within the allowable range by staying on standby from the timing when the processing in ACT 150 is performed until the delay time specified in ACT 160 elapses.

Subsequently, the control unit 300 stays on standby from the timing when the processing in ACT 150 is performed until the delay time specified in ACT 160 elapses (ACT 170). In other words, in ACT 170, the control unit 300 stays on standby until an elapsed time from the timing exceeds the delay time. The control unit 300 may be configured to determine, in ACT 170, whether the delay time elapses from timing later than the timing.

If determining that the delay time elapses (YES in ACT 170), the control unit 300 stops the driving of the motor MT (ACT 180) to thereby stop the lifting of the tray TR and ends the processing of the flowchart shown in FIG. 9.

By performing the processing explained above, the control unit 300 keeps, within the allowable range, the contact position where the printing medium conveyed by the first conveying unit comes into contact with the guide unit GD. As a result, the image forming apparatus 100 can prevent performance for making it easy for the guide unit GD to separate the plurality of printing media from fluctuating because of the number of printing media stacked on the tray TR and can prevent a paper jam from occurring.

Difference of a Delay Time Corresponding to the Number Of Printing Media Stacked on the Tray A difference of a delay time corresponding to the number of printing media stacked on the tray TR is explained below with reference to FIGS. 11 and 12.

Figure 11:
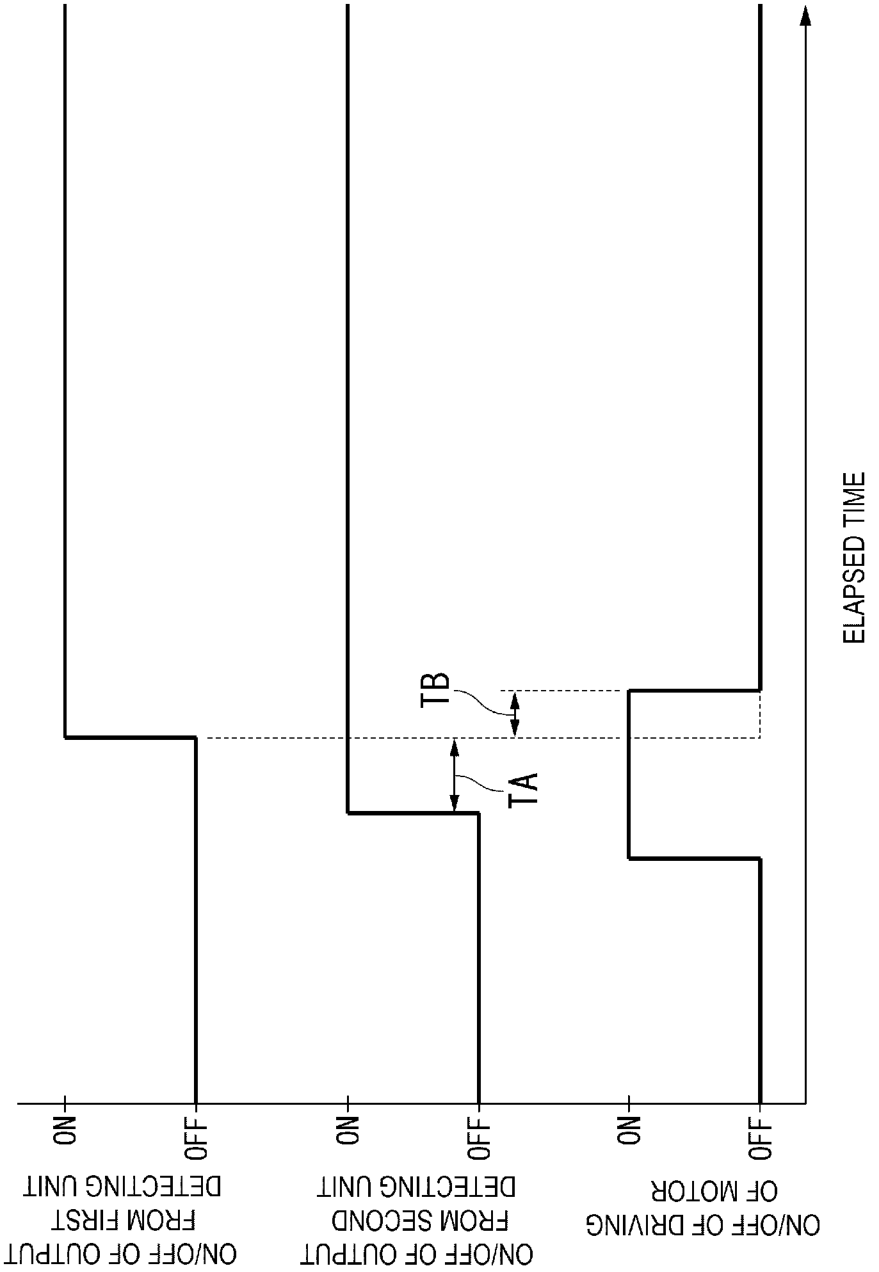
FIG. 11 is a timing chart showing an example of timings of ON and OFF of driving of a motor, an output from a first detecting unit, and an output from the second detecting unit when a maximum storable number of printing media is stacked on the tray.

FIG. 11 is a timing chart showing an example of timings of ON and OFF of driving of the motor MT, an output from the first detecting unit TSA, and an output from the second detecting unit TSB when the maximum storable number of printing media is stacked on the tray TR. The timing of ON of the driving of the motor MT means timing when the motor MT is driven. For convenience of explanation, the timing of ON of the driving of the motor MT is referred to as motor ON timing. The timing of OFF of the driving of the motor MT means timing when the driving of the motor MT is stopped. For convenience of explanation, the timing of OFF of the driving of the motor MT is referred to as motor OFF timing. The timing of ON Of the output from the first detecting unit TSA means timing when the first detecting unit TSA outputs information indicating that the position of the top part reaches the first position. For convenience of explanation, the timing of ON of the output from the first detecting unit TSA is referred to as first timing. The timing of OFF of the output from the first detecting unit TSA means timing when the first detecting unit TSA stops outputting the information indicating that the position of the top part reached the first position. In FIG. 11, to simplify the figure, the timing of OFF of the output from the first detecting unit TSA is omitted. The timing of ON of the output from the second detecting unit TSB means timing when the second detecting unit TSB outputted information indicating that the lift mechanism LM started the lifting of the tray TR. For convenience of explanation, the timing of ON of the output from the second detecting unit TSB is referred to as second timing. The timing of OFF of the output from the second detecting unit TSB means timing when the second detecting unit TSB stopped outputting the information indicating that the lift mechanism LM started the lifting of the tray TR. In FIG. 11, to simplify the figure, the timing of OFF of the output from the second detecting unit TSB is omitted.

The second timing is timing when the tray TR started to rise. As shown in FIG. 11, the second timing is timing later than the motor ON timing. This is because there is a time lag between timing when the shaft SH starts to rotate according to the driving of the motor MT and timing when the tray TR starts to rise. The time lag includes a time lag due to, for example, assembly accuracy of the lift mechanism LM.

The first timing is timing when the position of the top part reached the first position. Accordingly, as shown in FIG. 11, the first timing is timing later than the second timing. A time TA between the first timing and the second timing is a time from when the lift mechanism LM starts the lifting of the tray TR until when the position of the top part reaches the first position. The delay time specified by the control unit 300 is specified according to the length of the time TA. In the example shown in FIG. 11, a time between the first timing and the motor OFF timing is a delay time specified according to the time TA by the control unit 300. That is, in this example, the control unit 300 stops the driving of the motor MT at timing when a time TB elapses from the first timing.

Figure 12:
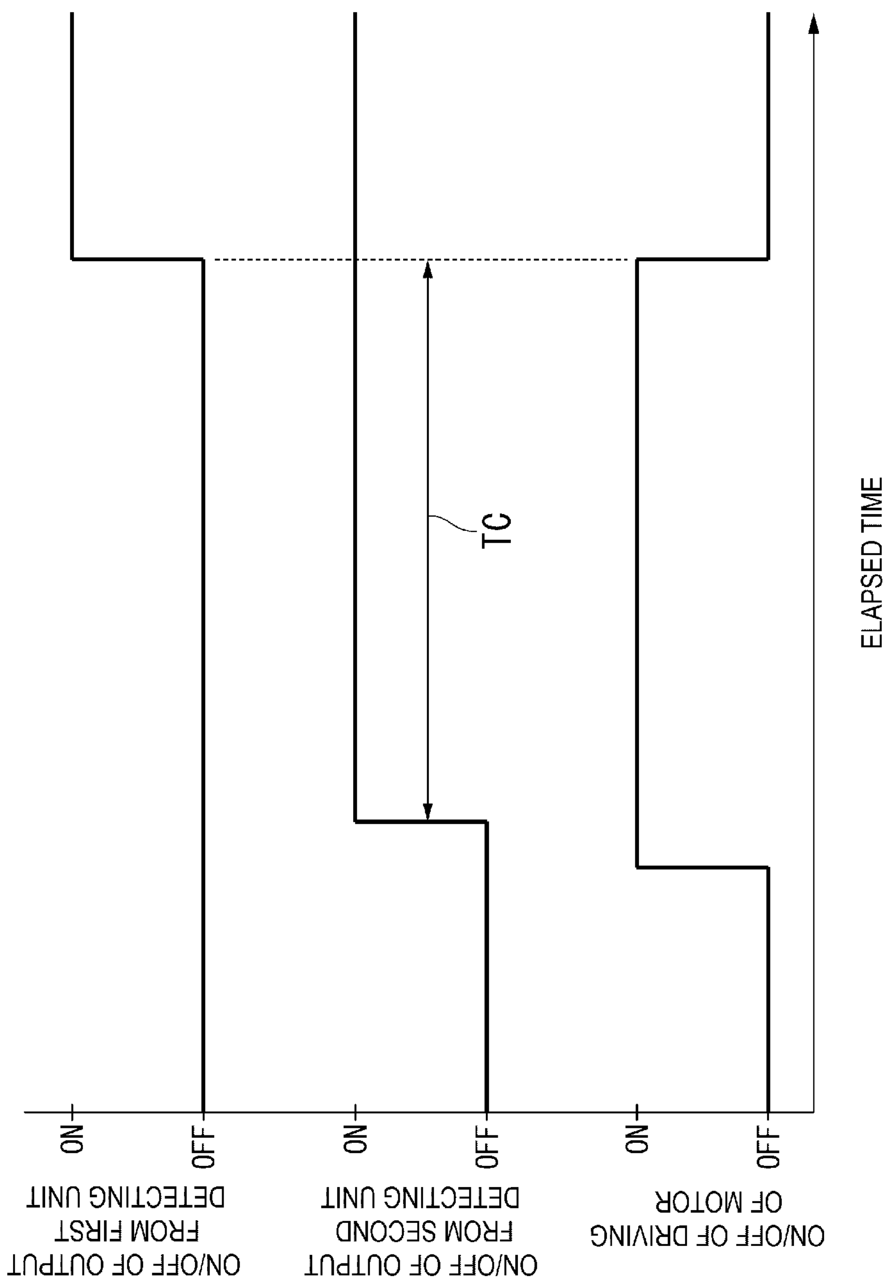
FIG. 12 is a timing chart showing an example of timings of ON and OFF of driving of the motor, an output from the first detecting unit, and an output from the second detecting unit when one printing medium is stacked on the tray.

On the other hand, FIG. 12 is a timing chart showing an example of timings of ON and OFF of driving of the motor MT, an output from the first detecting unit TSA, and an output from the second detecting unit TSB when one printing medium is stacked on the tray. In FIG. 12, to simplify the figure, the timing of OFF of the output from the first detecting unit TSA is omitted. In FIG. 12, to simplify the figure, the timing of OFF of the output from the second detecting unit TSB is omitted.

In FIG. 12, the motor OFF timing and the first timing coincide. This is because, in the example shown in FIG. 12, a delay time when one printing medium is stacked on the tray TR is 0 second. A time TC shown in FIG. 12 is a time in this case and is a time from when the lift mechanism LM starts the lifting of the tray TR until when the position of the top part reaches the first position.

In this way, the control unit 300 changes the delay time according to the number of printing media stacked on the tray TR. In other words, the control unit 300 adjusts the delay time corresponding to the number of printing media stacked on the tray TR. The control unit 300 performs the adjustment of the delay time according to the value indicating the movement amount. Consequently, the image forming apparatus 100 can prevent performance for making it easy for the guide unit GD to separate the plurality of printing media from fluctuating because of the number of printing media stacked on the tray TR and can prevent a paper jam from occurring.

As explained above, the image forming apparatus according to the embodiment (in the example explained above, the image forming apparatus 100) includes a paper feeding cassette (in the example explained above, the paper feeding cassette 141), a first conveying unit (in the example explained above, the first conveying unit RA), a lift mechanism (in the example explained above, the lift mechanism LM), a motor (in the example explained above, the motor MT), a second conveying unit (in the example explained above, the second conveying unit RB), and a control unit (in the example explained above, the control unit 300). The paper feeding cassette includes the tray (in the example explained above, the tray TR) on which one or more sheets (in the example explained above, printing media) are stacked. The first conveying unit comes into contact with a sheet stacked at a top part among the one or more sheets stacked on the tray and conveys the sheet from the top part. The lift mechanism lifts the tray and brings the one or more sheets stacked on the tray close to the first conveying unit. The motor causes the lift mechanism to lift the tray. The second conveying unit conveys the sheet conveyed by the first conveying unit to a conveyance path. The control unit drives the motor and, if a value indicating a movement amount of the tray moving from when the lift mechanism starts the lifting of the tray until when a position of the top part reaches a first position is a first value, matches a position of the first conveying unit, which comes into contact with the top part to thereby rise together with the tray, with a second position and, if the value indicating the movement amount is a second value larger than the first value, matches the position of the first conveying unit, which comes into contact with the top part to thereby rise together with the tray, with a third position lower than the second position. Consequently, the image forming apparatus 100 can prevent performance for making it easy for a guide unit to separate the plurality of sheets from fluctuating because of the number of sheets stacked on the tray and can prevent a paper jam from occurring.

In the image forming apparatus, a configuration may be used in which the value indicating the movement amount is a time from when the lift mechanism starts the lifting of the tray until when the position of the top part reaches the first position.

In the image forming apparatus, a configuration may be used in which the value indicating the movement amount is a value indicating a distance that the tray moves from when the lift mechanism starts the lifting of the tray until when the position of the top part reaches the first position.

In the image forming apparatus, a configuration may be used in which the value indicating the distance is a pulse output from an encoder that detects a rotation amount of a shaft (in the example explained above, the shaft SH) rotated by the driving of the motor.

A configuration may be used in which the image forming apparatus includes an optical sensor configured to detect a distance to an object based on reflected light of light radiated on the object, and the value indicating the distance is a distance to the position of the top part detected by the optical sensor.

A configuration may be used in which the image forming apparatus includes a first detecting unit (in the example explained above, the first detecting unit TSA) configured to detect that the position of the top part reached the first position.

A configuration may be used in which the image forming apparatus includes a second detecting unit (in the example explained above, the second detecting unit TSB) configured to detect, according to a position of a first member (in the example explained above, the first member AC) that moves together with a shaft rotated by the driving of the motor, that the lift mechanism started the lifting of the tray.

In the image forming apparatus, a configuration may be used in which the control unit specifies, as timing when the lift mechanism started the lifting of the tray, timing when the motor started driving to cause the lift mechanism to start the lifting of the tray.

A configuration may be used in which the image forming apparatus further includes a guide unit (in the example explained above, the guide unit GD) configured to guide the sheet conveyed by the first conveying unit to the second conveying unit, and the control unit matches the position of the first conveying unit with the second position if the value indicating the movement amount is the first value and matches the position of the first conveying unit with the third position if the value indicating the movement amount is the second value to thereby keep, within an allowable range, a contact position where the sheet conveyed by the first conveying unit comes into contact with the guide unit.

In the image forming apparatus, a configuration may be used in which the control unit continues the driving of the motor from when the position of the top part reaches the first position until when a delay time corresponding to the value indicating the movement amount elapses and, if the delay time elapses from when the position of the top part reaches the first position, stops the driving of the motor to thereby match the position of the first conveying unit with the second position if the value indicating the movement amount is the first value and match the position of the first conveying unit with the third position if the value indicating the movement amount is the second value.

The several embodiments of the present invention are explained above. However, the embodiments are presented as examples and are not intended to limit the scope of the invention. These embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

The functions of any components in the apparatus (for example, the image forming apparatus 100) explained above may be realized by recording programs for realizing the functions in a computer-readable recording medium, causing a computer system to read the programs recorded in the recording medium, and executing the programs. The "computer system" includes an OS (Operating System) and hardware such as peripheral devices. The "computer-readable recording medium" refers to a portable medium such as a flexible disk, a magneto-optical disk, a ROM, or a CD (Compact Disk)-ROM or a storage device such as a hard disk incorporated in the computer system. Further, the "computer-readable recording medium" includes a recording medium that retains the program for a fixed period of time like a volatile memory (RAM) inside the computer system functioning as a server or a client when the program is transmitted via a network such as the Internet or a communication line such as a telephone line.

The program may be transmitted from the computer system in which the program is stored in the storage device or the like to other computer systems via a transmission medium or by a transmission wave in the transmission medium. The "transmission medium" for transmitting the program means a medium having a function of transmitting information like a network (a communication network) such as the Internet or a communication line (a communication wire) such as a telephone line.

The program may be a program for realizing a part of the functions explained above. Further, the program may be a program that can realize the functions in combination with a program already recorded in the computer system, a so-called differential file (differential program).

While certain embodiments have been described, these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:

a paper feeding cassette comprising a tray on which one or more sheets are stacked;

a first conveying component configured to contact a sheet stacked at a top part among the one or more sheets stacked on the tray and convey the sheet from the top part;

a lift mechanism configured to lift the tray and bring the one or more sheets stacked on the tray close to the first conveying component;

a motor configured to cause the lift mechanism to lift the tray;

a second conveying component configured to convey the sheet conveyed by the first conveying component to a conveyance path;

a controller configured to drive the motor, and if a value indicating a movement amount of the tray moving from when the lift mechanism starts the lifting of the tray until when a position of the top part reaches a first position is a first value, match a position of the first conveying component, which comes into contact with the top part to thereby rise together with the tray, with a second position, and if the value indicating the movement amount is a second value larger than the first value, match the position of the first conveying component, which contacts the top part to thereby rise together with the tray, with a third position lower than the second position; and a detecting unit configured to detect, according to a position of a first member that moves together with a shaft rotated by the driving of the motor, that the position of the top part reaches the first position by the operation of the lift mechanism starting the lifting of the tray.

2. The image forming apparatus according to claim 1, wherein the value indicating the movement amount is a time from when the lift mechanism starts the lifting of the tray until when the position of the top part reaches the first position.

3. The image forming apparatus according to claim 1, wherein the value indicating the movement amount is a value indicating a distance that the tray moves from when the lift mechanism starts the lifting of the tray until when the position of the top part reaches the first position.

4. The image forming apparatus according to claim 3, wherein the value indicating the distance is a pulse output from an encoder that detects a rotation amount of a shaft rotated by the driving of the motor.

5. An image forming apparatus, comprising:

a paper feeding cassette comprising a tray on which one or more sheets are stacked;

a first conveying component configured to contact a sheet stacked at a top part among the one or more sheets stacked on the tray and convey the sheet from the top part;

a lift mechanism configured to lift the tray and bring the one or more sheets stacked on the tray close to the first conveying component;

a motor configured to cause the lift mechanism to lift the tray;

a second conveying component configured to convey the sheet conveyed by the first conveying component to a conveyance path; and a controller configured to drive the motor, and if a value indicating a movement amount of the tray moving from when the lift mechanism starts the lifting of the tray until when a position of the top part reaches a first position is a first value, match a position of the first conveying component, which comes into contact with the top part to thereby rise together with the tray, with a second position, and if the value indicating the movement amount is a second value larger than the first value, match the position of the first conveying component, which contacts the top part to thereby rise together with the tray, with a third position lower than the second position; and a detecting unit configured to detect, according to a position of a first member that moves together with a shaft rotated by the driving of the motor, that the lift mechanism starts the lifting of the tray.

6. The image forming apparatus according to claim 5, further comprising:

an optical sensor configured to detect a distance to an object based on reflected light of light radiated on the object, wherein the value indicating the distance is a distance to the position of the top part detected by the optical sensor.

7. The image forming apparatus according to claim 5, wherein the value indicating the movement amount is a time from when the lift mechanism starts the lifting of the tray until when the position of the top part reaches the first position.

8. The image forming apparatus according to claim 5, wherein the value indicating the movement amount is a value indicating a distance that the tray moves from when the lift mechanism starts the lifting of the tray until when the position of the top part reaches the first position.

9. An image forming apparatus, comprising:

a paper feeding cassette comprising a tray on which one or more sheets are stacked;

a first conveying component configured to contact a sheet stacked at a top part among the one or more sheets stacked on the tray and convey the sheet from the top part;

a lift mechanism configured to lift the tray and bring the one or more sheets stacked on the tray close to the first conveying component;

a motor configured to cause the lift mechanism to lift the tray;

a second conveying component configured to convey the sheet conveyed by the first conveying component to a conveyance path;

a controller configured to drive the motor, and if a value indicating a movement amount of the tray moving from when the lift mechanism starts the lifting of the tray until when a position of the top part reaches a first position is a first value, match a position of the first conveying component, which comes into contact with the top part to thereby rise together with the tray, with a second position, and if the value indicating the movement amount is a second value larger than the first value, match the position of the first conveying component, which contacts the top part to thereby rise together with the tray, with a third position lower than the second position, wherein the controller specifies first timing defining when the lift mechanism starts the lifting of the tray by defining second timing when the motor starts driving to cause the lift mechanism to start the lifting of the tray; and a detecting unit configured to detect, according to a position of a first member that moves together with a shaft rotated by the driving of the motor, that the lift mechanism starts the lifting of the tray.

10. The image forming apparatus according to claim 9, further comprising:

a guide component configured to guide the sheet conveyed by the first conveying component to the second conveying component, wherein the controller matches the position of the first conveying component with the second position if the value indicating the movement amount is the first value and matches the position of the first conveying component with the third position if the value indicating the movement amount is the second value to thereby keep, within an allowable range, a contact position where the sheet conveyed by the first conveying component contacts the guide component.

11. The image forming apparatus according to claim 9, wherein the controller continues the driving of the motor from when the position of the top part reaches the first position until when a delay time corresponding to the value indicating the movement amount elapses, and if the delay time elapses from when the position of the top part reaches the first position, stops the driving of the motor to thereby match the position of the first conveying component with the second position if the value indicating the movement amount is the first value and to thereby match the position of the first conveying component with the third position if the value indicating the movement amount is the second value.

12. A paper handling method, comprising:

lifting a tray and bringing one or more sheets stacked on the tray close to a first conveying component;

controlling the lifting wherein if a value indicating a movement amount of the tray moving from when the lifting of the tray starts until when a position of the top part reaches a first position is a first value, matching a position of the first conveying component, which comes into contact with the top part to thereby rise together with the tray, with a second position, or if the value indicating the movement amount is a second value larger than the first value, matching the position of the first conveying component, which contacts the top part to thereby rise together with the tray, with a third position lower than the second position; and detecting, according to a position of a first member that moves together with a shaft rotated by a driving of a motor, that the position of the top part reaches the first position, by an operation of a lift mechanism starting the lifting of the tray;

contacting a sheet, stacked at a top part among the one or more sheets stacked on the tray, and conveying, by the first conveying component, the sheet from the top part; and conveying to a conveyance path, by a second conveying component, the sheet conveyed by the first conveying component.

13. The paper handling method according to claim 12, wherein the value indicating the movement amount is a time from when the lifting of the tray starts until when the position of the top part reaches the first position.

14. The paper handling method according to claim 12, wherein the value indicating the movement amount is a value indicating a distance that the tray moves from when the lifting of the tray starts until when the position of the top part reaches the first position.

15. The paper handling method according to claim 14, wherein the value indicating the distance is a pulse output from an encoder that detects a rotation amount of a shaft rotated by driving of a motor.

16. The paper handling method according to claim 12, further comprising:

detecting a distance to an object based on reflected light of light radiated on the object, wherein the value indicating the distance is a distance to the position of the top part detected.

17. The paper handling method according to claim 12, wherein controlling specifies first timing defining when the lifting of the tray starts by defining second timing when a motor starts driving to cause a lift mechanism to start the lifting of the tray.

18. The paper handling method according to claim 12, further comprising:

guiding the sheet conveyed by the first conveying component to the second conveying component; and matching the position of the first conveying component with the second position if the value indicating the movement amount is the first value and matches the position of the first conveying component with the third position if the value indicating the movement amount is the second value to thereby keep, within an allowable range, a contact position where the sheet conveyed by the first conveying component contacts a guide component.

19. The paper handling method according to claim 12, wherein the driving of a motor continues from when the position of the top part reaches the first position until when a delay time corresponding to the value indicating the movement amount elapses, and if the delay time elapses from when the position of the top part reaches the first position, stops the driving of the motor to thereby match the position of the first conveying component with the second position if the value indicating the movement amount is the first value and to thereby match the position of the first conveying component with the third position if the value indicating the movement amount is the second value.

* * * * *